(12) United States Patent
Gregory (10) Patent No.: US 7,162,100 B1
(45) Date of Patent: Jan. 9, 2007

(54) METHODS FOR IMAGE ENHANCEMENT

(75) Inventor: Donald David Gregory, Fort Wayne, IN (US)

(73) Assignee: ITT Manufacturing Enterprises Inc., Wilmington, DE (US)

(*) Notice: Subject to any disclaimer, the term of this patent is extended or adjusted under 35 U.S.C. 154(b) by 785 days.

(21) Appl. No.: 10/316,625

(22) Filed: Dec. 11, 2002

(51) Int. Cl.
*G06K 9/36* (2006.01)

(52) U.S. Cl. .................... 382/280; 382/260; 382/274; 382/275; 358/1.2; 358/3.26; 358/3.27

(58) Field of Classification Search ............... 382/274, 382/275, 280, 282, 260; 358/3.26, 3.27, 358/520, 463, 1.2, 2.26
See application file for complete search history.

(56) References Cited

U.S. PATENT DOCUMENTS

| | | | |
|---|---|---|---|
| 4,991,970 A | 2/1991 | Darboux et al. | |
| 5,315,562 A | 5/1994 | Bradley et al. | |
| 5,345,172 A * | 9/1994 | Taguchi et al. | 324/309 |
| 5,499,111 A * | 3/1996 | Sato et al. | 382/252 |
| 6,002,794 A * | 12/1999 | Bonneau et al. | 382/166 |
| 6,295,392 B1 * | 9/2001 | Gregory et al. | 382/321 |
| 6,782,342 B1 * | 8/2004 | LeGore et al. | 702/181 |

\* cited by examiner

*Primary Examiner*—Jingge Wu
*Assistant Examiner*—Yosef Kassa
(74) *Attorney, Agent, or Firm*—RatnerPrestia (57) ABSTRACT

There is disclosed a method of enhancing an image of a scene. The method divides the image into a plurality of frequency zones, and performs a plurality of Richardson and Lucy (RL) iterations of each of the frequency zones to obtain an enhanced image of the scene. The frequency zones and the plurality of RL iterations are determined using a Taguchi orthogonal array computation that minimizes radiometric errors in the enhanced image. The image may be Rayleigh sampled image obtained by a Rayleigh sampling system. A truth scene is not needed to use the method.

23 Claims, 7 Drawing Sheets

METHODS FOR IMAGE ENHANCEMENT

FIELD OF THE INVENTION

The present invention relates, in general, to enhancing an image of a scene, and more particularly, to methods of improving radiometric accuracy of objects within an image of a scene using a Bayesian based, Richardson and Lucy iteration algorithm.

BACKGROUND OF THE INVENTION

Image enhancement algorithms that use a Bayesian based, Richardson and Lucy iteration approach for under-sampled imaging systems have been developed. These image enhancement algorithms may improve the radiometric accuracy of objects in the image by attempting to bring the objects back to their true radiometric values. These objects in the image are, typically, under sampled by a factor of 2.4, using a Rayleigh sampled imaging system.

There are fundamental problems with the current algorithms. First, these algorithms enhance objects of different sizes at different rates within the image. This results in some objects in the image not being enhanced enough, and some objects in the image being over enhanced, such that the radiometric error of an object may actually increase.

Second, these algorithms use a number of iterations or computer runs as a parameter to determine how much the image is enhanced. Without a "truth" image, is it very difficult to determine how much iteration to give an image, in order to minimize radiometric errors of the objects within the image. If the number of iterations is too small, the objects within the image may be under enhanced. If the number of iterations is too large, however, the objects within the image may be over enhanced, thereby increasing the errors.

The present invention addresses these problems.

SUMMARY OF THE INVENTION

To meet this and other needs, and in view of its purposes, the present invention provides a method of enhancing an image of a scene. The method includes the steps of: (a) dividing the image into a plurality of frequency zones; and (b) performing a plurality of Richardson and Lucy (RL) iterations of each of the frequency zones to obtain an enhanced image of the scene. Step (b) of the method includes obtaining a succession of intermediary enhanced images using the plurality of RL iterations, where a first intermediary enhanced image is obtained prior to a second intermediary enhanced image. Step (b) of the method further includes transforming each intermediary enhanced image into a frequency space to obtain a respective Fast Fourier Transform (FFT) corresponding to each intermediary enhanced image, and setting a respective FFT of the second successive intermediary enhanced image to include a respective FFT of the first successive intermediary enhanced image. Step (b) of the method also includes obtaining a third intermediary enhanced image, where the third intermediary enhanced image is obtained after the second intermediary enhanced image. Moreover, step (b) of the method includes setting a respective FFT of the third successive intermediary enhanced image to include a respective FFT of the first and second successive intermediary enhanced images to form a composite FFT, and transforming the composite FFT to obtain the enhanced image of the scene.

In an embodiment of the invention, step (a) of the method may include dividing the image into three frequency zones. The size of the three frequency zones may be determined using a Taguchi orthogonal array computation that minimizes a radiometric error function in the enhanced image. The image may be a Rayleigh sampled image obtained by a Rayleigh sampling system. Step (b) of the method may include (i) performing a first number of RL iterations on the image to obtain a first enhanced image including a first frequency zone; (ii) performing a second number of RL iterations on the first enhanced image to obtain a second enhanced image including a second frequency zone; and (iii) performing a third number of RL iterations on the second image to obtain a third enhanced image including a third frequency zone. The first, second and third numbers of RL iterations may be determined using a Taguchi orthogonal array computation that minimizes a radiometric error in the image.

In another embodiment of the invention, there is a method of enhancing an image of a scene including the steps of: (a) performing a first number of iterations on the image to obtain a first enhanced image; (b) transforming the first enhanced image into a Fast Fourier Transform (FFT); and (c) selecting a portion of a total energy content of the first enhanced image in the FFT, where the first number of iterations has a value determined by minimizing radiometric errors in the first enhanced image. The method may determine a value of the first number of iterations by (i) selecting at least two objects within the image, and (ii) minimizing radiometric errors using the selected objects in the first enhanced image. The radiometric errors of the selected objects may be minimized by using a Taguchi orthogonal array. The method may select objects of different pixel sizes.

The invention further includes a machine-readable storage medium containing a set of instructions for causing a computer to perform the following steps: (a) executing a Lucy and Richardson (RL) algorithm to enhance an image; and (b) iterating the RL algorithm for a number of iterations, in which the number of iterations is determined by a Taguchi orthogonal array process. The set of instructions may further include the steps of: (c) transforming the enhanced image using a Fast Fourier Transform (FFT); (d) selecting a portion of a total energy content of the enhanced image in the FFT; and (e) inverse transforming the selected portion in the FFT into a final enhanced image. Step (b) of the instruction set may select at least two objects in the image, and may determine the number of iterations by minimizing radiometric errors of the selected objects. The radiometric errors may be minimized by controlling parameters in the RL algorithm, where one of the parameters is the number of iterations.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

The present invention is directed to a method of improving radiometric accuracy of objects within a scene, by enhancing all the objects within the image, regardless of size, such that the radiometric errors of the small objects are minimized. The method may be applied to general images taken of a scene by a Rayleigh sampled system, where the truth of the scene is not known.

It will be appreciated that many earth-viewing imaging sensors flown in outer space are Rayleigh sampled systems. The present invention, however, is not limited to enhancing images produced by a Rayleigh sampled system, but may be applied to images produced by other types of sampling systems (over sampled, or under sampled).

As will be explained, the present invention divides an image of a scene into three frequency zones. A Richardson and Lucy (RL) algorithm iterates each frequency zone of the image and optimizes each zone individually. The RL algorithm first iterates the lower spatial frequency zone and then progresses to the higher spatial frequency zones. As will be explained, the present invention uses five parameters to bring about optimization in enhancing the image.

Two of these five parameters are first and second cutoff frequencies (R1 and R2), which allow the image to be divided into three frequency zones. The remaining three of these five parameters are the number of iterations (runs) used in the RL algorithm to iterate the first, second and third frequency zones of the image (namely, number of iterations rr1, rr2 and rr3).

As will also be explained, the values of these five parameters may be determined using a Taguchi orthogonal array approach. The Taguchi approach controls these five parameters (or control variables) to minimize radiometric errors in an enhanced image. Once the values of these control parameters are determined for a particular imaging system, the same values may be used for all images produced by this particular system.

Figure 1:
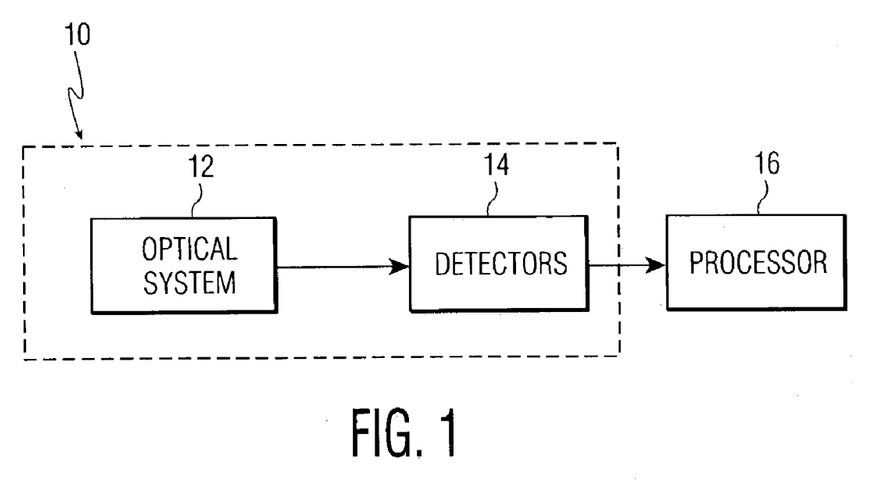
FIG. 1 is a general block diagram of an optical sensor accommodating the present invention.

Referring first to FIG. 1, there is shown a general block diagram of an optical sensor accommodating the present invention. Sensor 10 includes optical system 12 and detectors 14. The optical system, which includes various combinations of lenses, mirrors and filters depending on the type of application, is used to focus light onto a focal plane having detectors 14. Sensor 10 may be a Rayleigh sampled system, which under samples a scene by a factor of 2.4. It will be appreciated that many imaging sensors flown in outer space for viewing the earth are Rayleigh sampled systems.

Optical system 12 may be described by an optical transfer function (OTF), which represents a complete image forming system, and which may be used to characterize that system.

Detectors 14 convert light received from optical system 12 into electrical signals, which become the data used to generate images. The data may be used by processor 16 to enhance each of the generated images. In accordance with the present invention, processor 16 executes a Richardson and Lucy (RL) algorithm to enhance an image. The RL image enhancement algorithm provides a standard method for reconstructing an image and is known in the art.

It will be appreciated that the RL image enhancement algorithm requires that the user specify a number of iterations (runs) for the algorithm. Processor 16 executes the RL algorithm and checks whether the number of iterations has been executed. If the number of iterations has been executed, the user may then examine the resulting enhanced image. As discussed previously with respect to conventional methods, without a "truth" image, however, there is no way to determine what the number of iterations should be in order to minimize the radiometric errors of objects within the image. Too much iteration may increase the radiometric errors, while too little iteration may still leave large errors. The present invention, as described below, determines values for the number of iterations (more specifically, a plurality of numbers of iterations).

Figure 2:
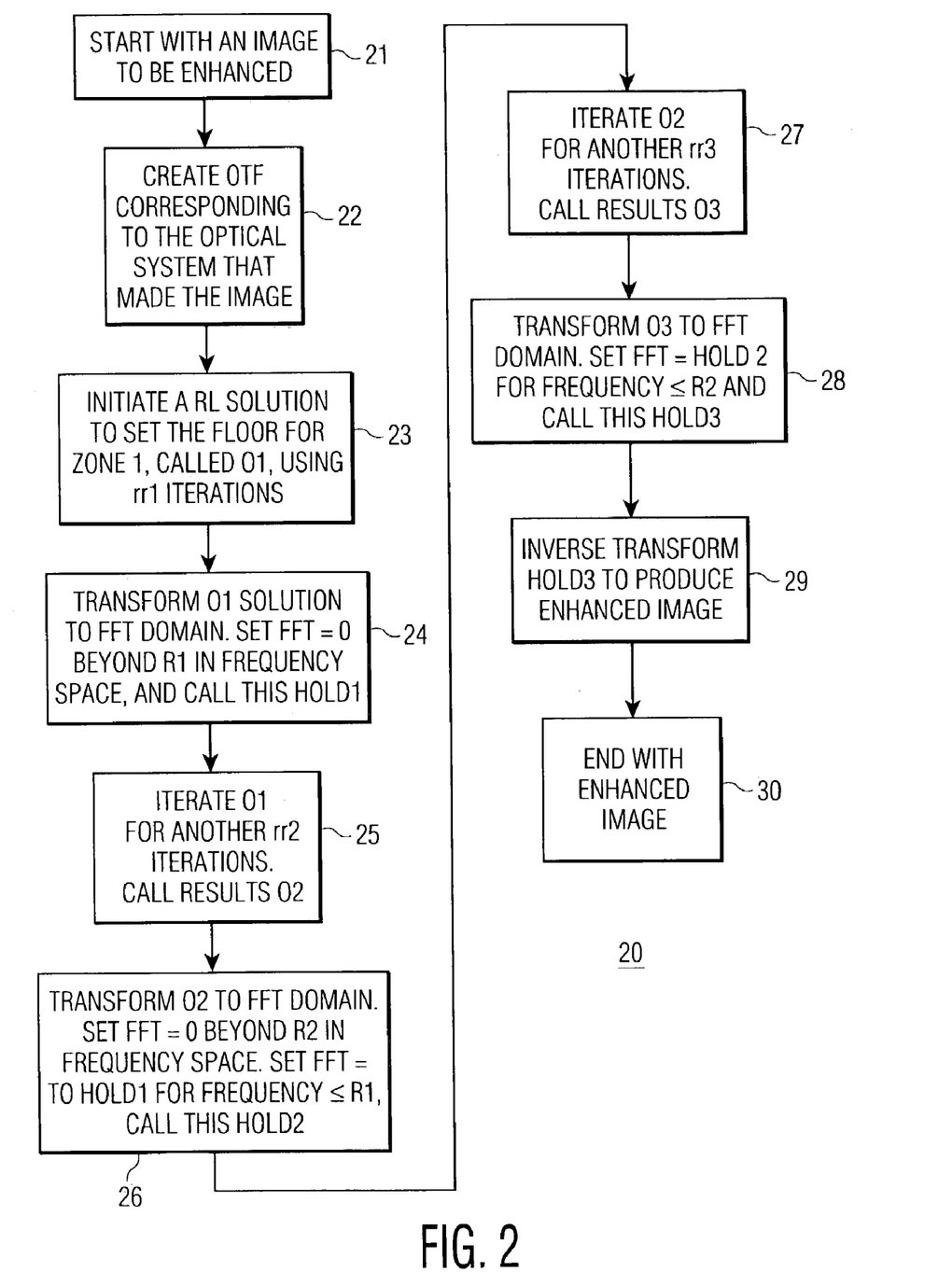
FIG. 2 is a flow diagram illustrating a method of enhancing an image in accordance with an embodiment of the invention.

Referring now to FIG. 2, there is shown a method for enhancing an image, generally designated as 20, in accordance with the present invention (for convenience, the method is also referred to herein as the hold process). As shown, the method starts in step 21 with an image to be enhanced. The optical system that produced the image is characterized by an optical transfer function (OTF) in step 22.

The method enters step 23. The RL image enhancement algorithm enhances the image by iterating the image rr1 times. The value of rr1 is determined using the Taguchi orthogonal array process, described later. A resulting first intermediary enhanced image is obtained, referred to as O1. Enhanced image O1 is then transformed into a frequency space in the Fast Fourier Transform (FFT) domain by step 24. The FFT of the image beyond a first frequency of R1 is set equal to zero.

Figure 3A:
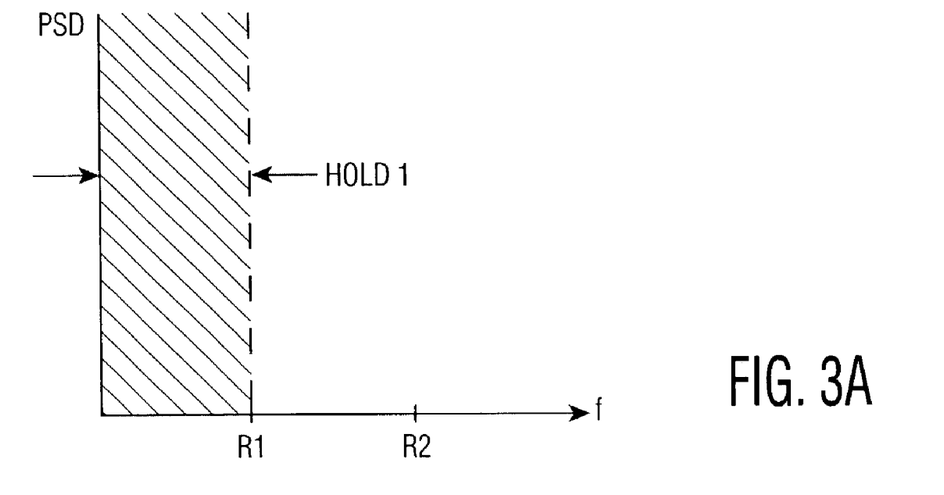
FIGS. 3A–3C are plots of power spectral density versus frequency for schematically illustrating division of a two dimensional image into frequency zones, as the image is enhanced by the method of FIG. 2 in accordance with an embodiment of the invention.

The value of R1 is determined using the Taguchi orthogonal array process, described later. The resulting transformed image is referred to as hold 1. It will be appreciated that hold 1 includes the transform of the image between DC (O frequency) and R1, as exemplified in FIG. 3A. Hold 1 represents the energy content of the image in a first frequency zone, the first frequency zone including the lowest frequencies.

Returning to the first intermediary enhanced image O1, the method enters step 25. This O1 image is then iterated for rr2 iterations using the RL image enhancement algorithm. The value of rr2 is determined using the Taguchi orthogonal array process, described later. A resulting second intermediary enhanced image is obtained, referred to as O2.

Figure 3B:
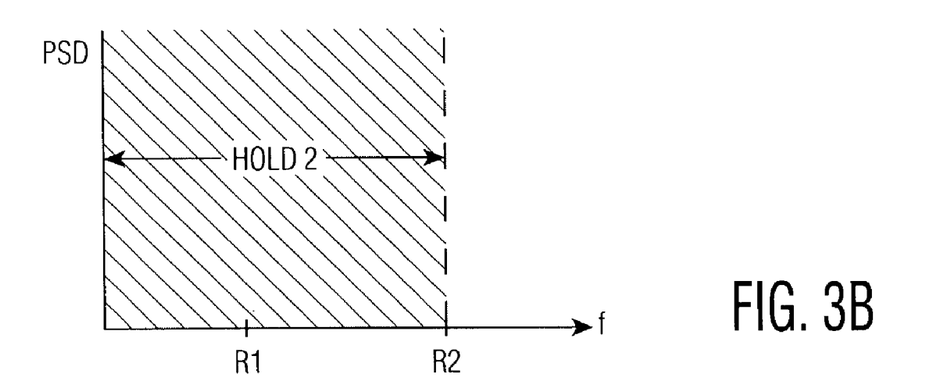

The method next enters step 26. Enhanced image O2 is then transformed into a frequency space in the FFT domain. The transform of the image in the FFT domain, beyond a second frequency of R2 (R2 is greater than R1) is set equal to zero. The transform of the image for frequencies less than or equal to R1 is set equal to hold 1. The resulting transform, which now includes energy of the image between DC and R2 is referred to as hold 2. The hold 2 region is shown in FIG. 3B.

Continuing this process, the method enters step 27. Enhanced image O2 is iterated for rr3 iterations using the RL image enhancement algorithm. The value of rr3 is determined using the Taguchi orthogonal array process, described later. A resulting third intermediary enhanced image is obtained, referred to as O3.

Figure 3C:
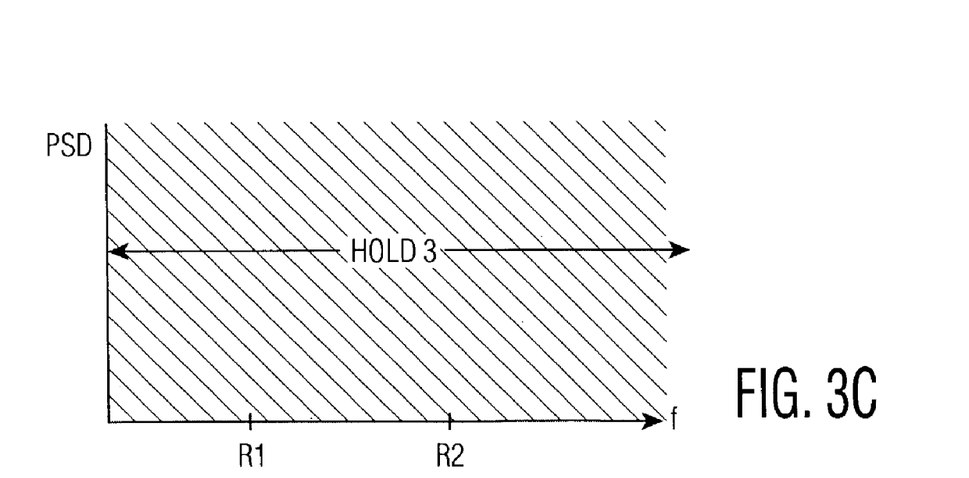

Enhanced image O3 is then transformed by step 28 into a frequency space in the FFT domain. This FFT is set equal to hold 2 for frequencies less than or equal to R2, and is left as is for frequencies greater than R2. The resulting FFT, which now includes energy of the image for all the frequencies is referred to as hold 3. The hold 3 region is shown in FIG. 3C.

Having the FFT of the hold 3 region, the method enters step 29, and performs an inverse transform operation of hold 3. The inverse transform produces the final enhanced image. The method ends in step 30.

By partitioning the image to be enhanced into frequency zones, and separately iterating each zone, starting with the lower spatial frequency zones and progressing to the higher spatial frequency zones, method 20 brings about an optimized enhanced image. It will be appreciated that, in the exemplary embodiment of FIG. 2, the image is partitioned into three frequency zones. In another embodiment, a similar method may be used in which the image may be divided into more than three frequency zones, or may be divided into two frequency zones only. By partitioning the image in this manner, objects of different sizes in the image may be brought to within a few percent of their true, radiometric values.

The manner of determining where the frequency zones are in the FFT space, and just how much each zone should be iterated in order to minimize radiometric errors of objects in the image will now be described.

Method 20, in the embodiment of FIG. 2, requires values of five parameters, namely:
  rr1=the number of iterations used first
  rr2=the number of iterations used second
  rr3=the number of iterations used third
  R1=the cut off frequency associated with rr1
  R2=the cut off frequency associated with rr2

These values are determined using a standard Taguchi orthogonal array process, in which rr1, rr2, rr3, R1 and R2 are controlled to minimize an error function during execution of method 20. The error function may be determined by selecting different objects in the image. The error function, in one exemplary embodiment, may be derived as follows:

Let the true radiometric value of an object, within a Rayleigh sampled scene, be called TV.

Let the radiometric value of the object, in the image to be enhanced, be called SV.

Form the following ratio:

$$R = |TV - SV|/SV$$

From the equation above, R is the ratio of the absolute value of the difference of an object's true radiometric value minus the radiometric value of the object in the image to be enhanced, divided by its radiometric value in the image to be enhanced.

The inventor discovered that when viewing high contrast regions of an earth scene, the ratio R depends primarily on the size of the object in pixel space, and not on the specifics of the object or the scene. The inventor also found that the starting error is larger, the smaller the object. This is so, because the errors due to photon spreading, caused by an optical system, occur at edges of the object, which are less important for larger objects.

The inventor conducted experiments and determined that the ratio R for high contrast objects in a scene, based on the size of the object (in pixel space) in the image to be enhanced, has the following values:
  (a) for objects approximately 1 pixel in size (point objects), R is approximately 0.60;
  (b) for objects approximately 5×5 pixels in size, R is approximately 0.10; and
  (c) for objects approximately 10×10 pixels in size, R is approximately 0.06.

It will be appreciated that the high contrast objects may be either of a positive high contrast or a negative high contrast.

Given an image to be enhanced, one next finds four to five high contrast objects within the image. One object selected may be 1 pixel large, at least one other object selected may be approximately 5×5 pixels large, and at least a further object selected may be approximately 10×10 pixels large.

After selecting the objects within the image, let
  SV1=the radiometric value of a pixel sized, high contrast object in the starting image;
  EnV1=the radiometric value of this object in the enhanced image;
  SV5=the radiometric value of a first 5×5 pixel sized object in the starting image;
  EnY5=the radiometric value of this first object in the enhanced image;
  SV5_2=the radiometric value of a second 5×5 pixel sized object in the starting image;
  EnV5_2=the radiometric value of this second object in the enhanced image; and
  SV10=the radiometric value of a 10×10 pixel sized, high contrast object in the starting image;
  EnV10=the radiometric value of this object in the enhanced image.

The error function then becomes:

$$\text{Error} = |\{|EnV1-SV1|/SV1\}-0.6| + |\{|EnV5-SV5|/SV5\}-0.1| + |\{|En10-SV10|/SV10\}-0.06| + |\{|EnV5\_2-SV5\_2|/SV5\_2\}-0.1| + \ldots \text{more points if used.}$$

The five parameters needed in the hold algorithm used by method 20 of FIG. 2 are:
  rr1=the number of iterations used in step 23 of the method;
  rr2=the number of iterations used in step 25 of the method;
  rr3=the number of iterations used in step 27 of the method;
  R1=the cut off frequency used in step 24 and step 26 of the method; and
  R2=the cut off frequency used in step 28 of the method.

The error function may now be used in a standard Taguchi, orthogonal array process to determine the five parameters—rr1, rr2, rr3, R1 and R2. These five parameters are used as control factors to determine values that minimize the error function. This example requires an $L_{18}(2^1 \times 3^7)$ array. From this standard, Taguchi, orthogonal array process, values of rr1, rr2, rr3, R1 and R2 that minimize the error function are determined, and used in the hold algorithm.

Figure 4:
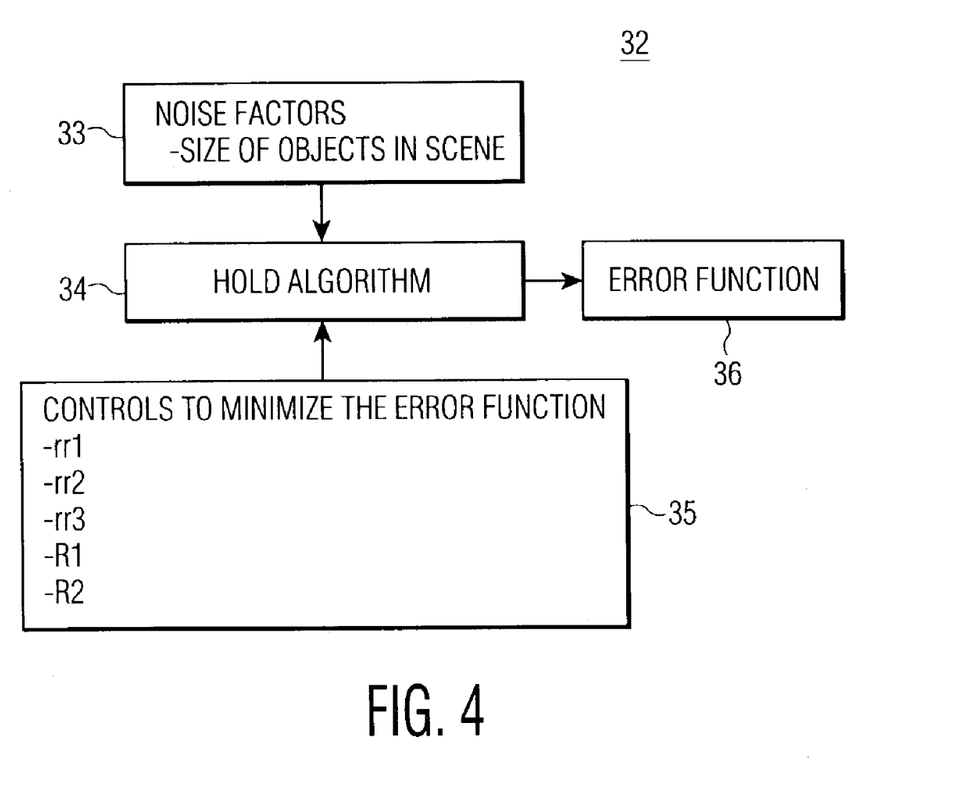
FIG. 4 is a parametric diagram illustrating control parameters and noise factors provided as input to an algorithm for enhancing an image and an error function provided as output from the algorithm, in which the error function is minimized in accordance with an embodiment of the invention.

FIG. 4 illustrates parametric diagram 32 for developing the values of the control parameters in the hold algorithm. As shown, method 20 of FIG. 2 uses the hold algorithm, generally designated as 34. The ideal output is a radiometrically true image for all objects within the image. The actual output is error function 36 that is computed from the enhanced image. Control factors 35 are used to minimize the error function.

In implementing the Taguchi process, the error function may be expressed by a signal-to-noise, s/n, function given by:

$$\frac{s}{n} = -10 \log\left(\frac{1}{N} \cdot \sum_{i=1}^{N} \text{error}_i^2\right)$$

N is the number of scene objects in the image used to determine the error function, and error, is the error for the $i^{th}$ object, as discussed previously. The s/n function is maximized in the Taguchi process. The noise factors based on the sizes of the objects in the scene are designated as 33 in FIG. 4.

Figure 5:
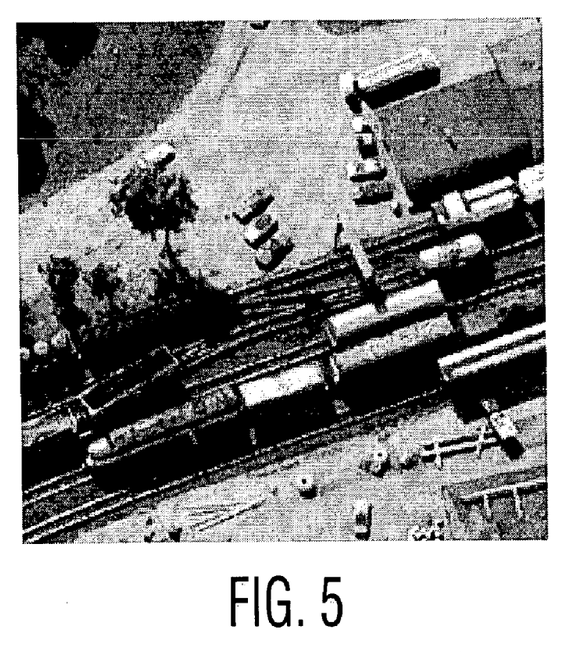
FIG. 5 is a true image of a train-yard scene.
Figure 6:
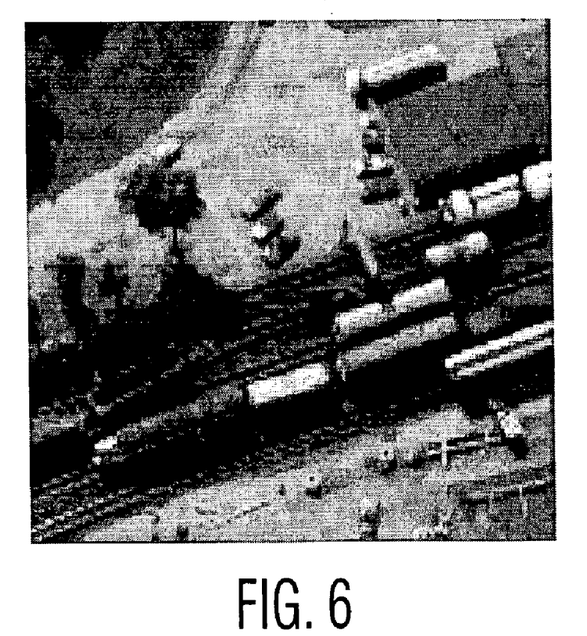
FIG. 6 is an image of the train-yard scene of FIG. 5 as sampled by a Rayleigh sampling system.

An example of a true image of a train-yard scene is shown in FIG. 5. Holes may be seen in each of three barrels, at the lower portion of the scene. The starting image of the same train-yard scene that includes noise and is Rayleigh sampled is shown in FIG. 6. The holes in the barrels depicted in FIG. 6 are hardly visible. The hole in the smallest barrel is not visible.

Figure 7:
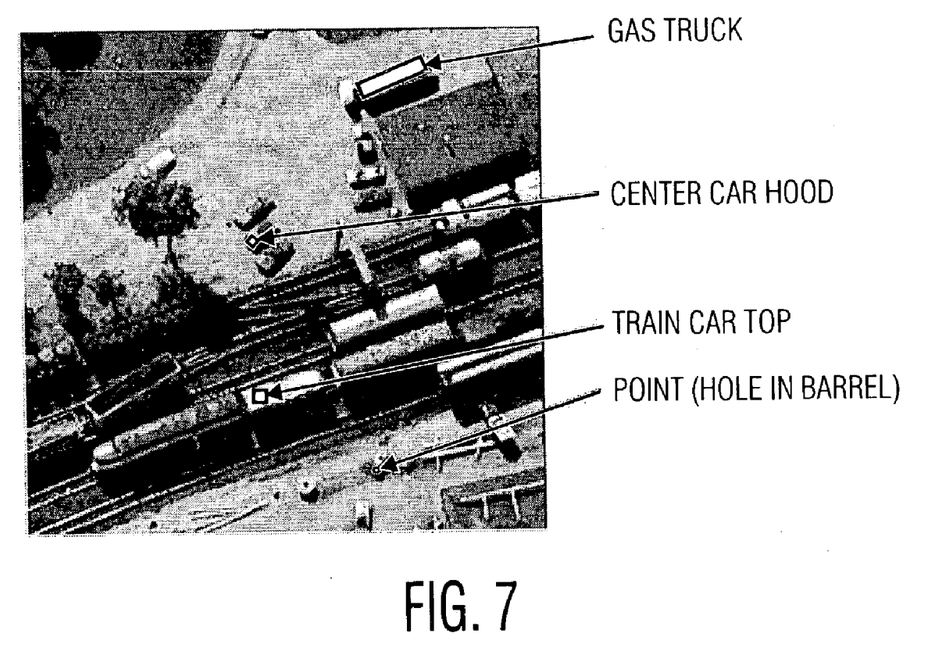
FIG. 7 shows four objects selected in the train-yard scene of FIG. 5 for use in a Taguchi process that minimizes errors in a method for enhancing an image, in accordance with an embodiment of the invention.
Figure 8:
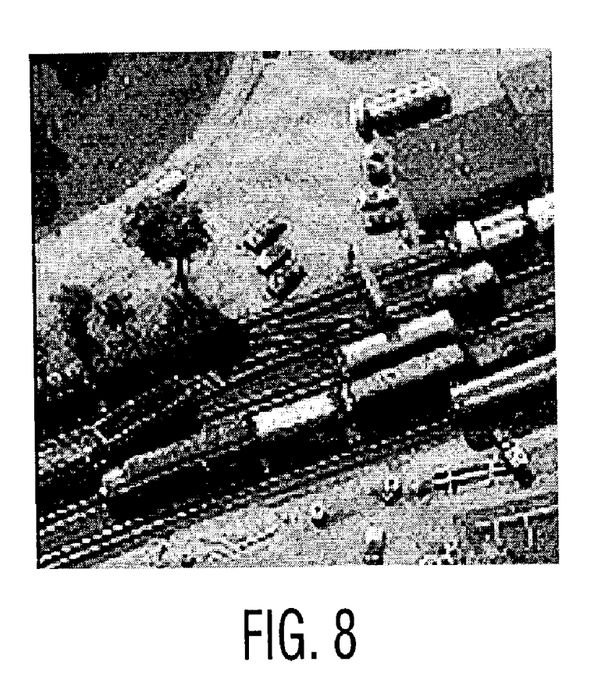
FIG. 8 shows a final enhanced image resulting from a method of the invention, in which the starting image is the Rayleigh sampled image of FIG. 6.

Four objects of different sizes used in the Taguchi process are shown in FIG. 7. The final enhanced image, using the hold algorithm, is shown in FIG. 8. The three holes in the three barrels, depicted in FIG. 8, are much sharper. The mottling of the enhanced image is due to the fact that the noise is enhanced, as well as the features of the image. If a pretty picture is desired, the control parameters may be chosen differently. In the exemplary embodiment of the invention, the method enhances the image radiometrically and the radiometric accuracy of small objects within the image are optimized. The small objects in the enhanced image are sharper and much more accurate in a radiometric sense.

The results of comparing true values of the exemplary image with the start image and the enhanced image are given below in a table.

Table of Comparison of Truth to the Start and Enhanced Objects

Point - hole in small barrel, lower middle of scene truth = 1248
start = 2529.8
enhance = 1263.4
truth-start error = (truth − start)/truth = 102.71%
truth-enhance error = (truth − enhance)/truth = 1.24%
Center Car Hood - hood of middle car in center of scene truth = 299,335
start = 269,640
enhance = 298,440
truth-start error = (truth − start)/truth = 9.92%
truth-enhance error = (truth − enhance)/truth = 0.30%
Train car top truth = 584,219
start = 558,460
enhance = 590,180
truth-start error = (truth − start)/truth = 4.41 %
truth-enhance error = (truth − enhance)/truth = 1.02%
Gas Truck truth = 3,034,607

-continued

Table of Comparison of Truth to the Start and Enhanced Objects start = 2,881,000
enhance = 3,063,200
truth-start error = (truth − start)/truth = 5.06%
truth-enhance error = (truth − enhance)/truth = 0.94%

As may be seen from the table, the enhancement algorithm has significantly reduced the error of all the selected objects in the exemplary image. Before enhancement, the point object has an error of 102.71%, and after enhancement, the point object has an error of only 1.2% from the true value. The car hood goes from an error before enhancement of 9.92%, to an error of only 0.30% after enhancement. The train car top goes from an error before enhancement of 4.41%, to an error of only 1.02% after enhancement. The gas truck goes from an error before enhancement of 5.06%, to an error of only 0.94% after enhancement. It will be appreciated that the starting error is larger, the smaller the object. This is so, because the errors due to photon spreading caused by the optical system occur at the edges of the object, which are less important the larger the object become's.

It will be appreciated that the inventor attempted other sets of control parameters to minimize the error function shown in FIG. 4. For example, the control parameters included 9 parameters composed of 4 different frequency zones (R1, R2, R3 and R4) and 5 different iteration parameters (rr1, rr2, rr3, rr4 and rr5). This required an $L_{27}$ array, which involved 27 computer runs. The Taguchi process led the inventor to reduce the number of control variables, leading finally to five variables, as shown in block 35 of FIG. 4. Five control variables required an $L_{18}$ array, which involved 18 computer runs.

Values for the final $L_{18}$ computer run are shown below in a table.

Table showing Parameter Values for $L_{18}$ Run.

| rr1 | 6 | 7 | 8 |
| rr2 | 70 | 73 | 76 |
| rr3 | 70 | 75 | 80 |
| R1 | 42 | 44 | 46 |
| R2 | 82 | 84 | 86 |

It is noted that the values shown for rr1, rr2 and rr3 correspond to numbers of iterations. The values shown for R1 and R2 correspond to frequency as represented by pixels in FFT space.

Once the values of the control parameters (five parameters in the example illustrated in FIG. 4) are determined, one may use the hold algorithm to execute method 20 of FIG. 2 for any image of a scene. It will be appreciated that for any imaging system, once the values of the control parameters are determined, the values of these control parameters are correct for any other scene imaged by the system. This is true so long as there are no major changes to the system (e.g. the OTF is the same) and the distances to the objects of interest do not change. Imaging sensors on a spacecraft that look down at the earth are typically in this category.

It will be understood that the Taguchi process, which is a non-linear process, solved for the five parameters using predetermined error values of objects in a scene (R ratio) in error function 36 of FIG. 4. These predetermined values apply to those imaging systems that are Rayleigh sampled systems, which under sample a scene by a factor of 2.4. The Taguchi process, however, may be applied to other systems that under sample a scene by other factors. These other systems would likely have other error values of objects in a scene for use in the error function.

Figure 9:
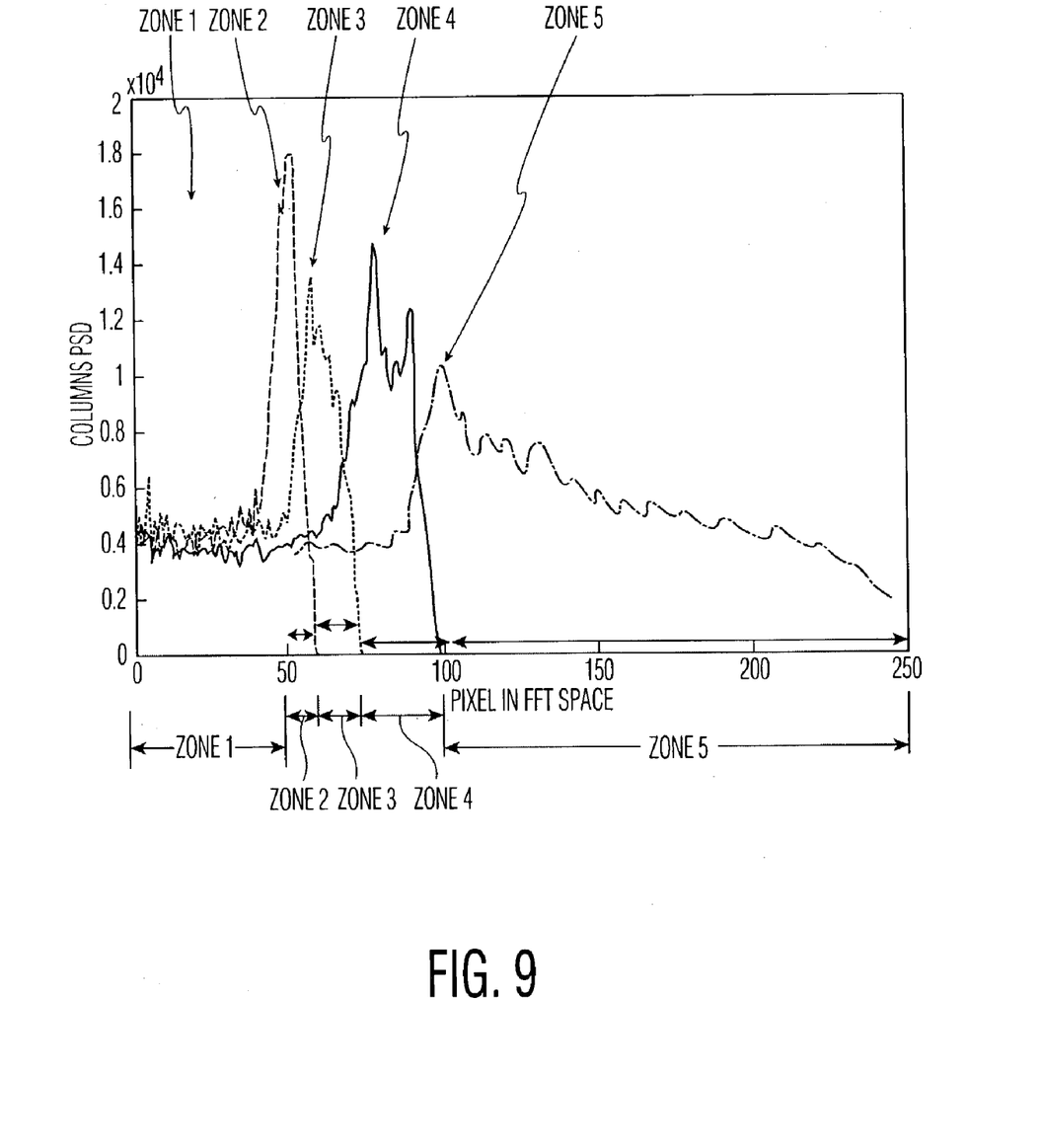
FIG. 9 is a plot of power spectral density (columns summed in FFT space) versus spatial frequency, depicting five frequency zones of an image of a true scene.

It is of interest to note that the exemplary hold algorithm divides the image into three frequency zones. A true image has more than three frequency zones, as shown, for example, in FIG. 9. Five frequency zones are shown representing a true scene in FFT space. The inventor has found, however, that dividing an image into three frequency zones provides an enhanced image that is sufficiently close to a true image.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of enhancing an image of a scene, the method comprising the steps of:
    (a) dividing the image into a plurality of frequency zones;
    (b) performing a plurality of Richardson and Lucy (RL) iterations of each of the frequency zones to obtain a succession of intermediary enhanced images, wherein a first intermediary enhanced image is obtained prior to a second intermediary enhanced image;
    (c) transforming each intermediary enhanced image into a frequency space to obtain a respective Fast Fourier Transform (FFT) corresponding to each intermediary enhanced image, and
    (d) setting a respective FFT of the second intermediary enhanced image to include a respective FFT of the first intermediary enhanced image.

2. The method of claim 1 in which step (b) includes obtaining a third intermediary enhanced image, wherein the third intermediary enhanced image is obtained after the second intermediary enhanced image,
    step (c) includes setting a respective FFT of the third intermediary enhanced image to include a respective FFT of the first and second intermediary enhanced images to form a composite FFT, and
    step (d) includes transforming the composite FFT to obtain the enhanced image of the scene.

3. The method of claim 1 in which step (a) includes dividing the image into three frequency zones.

4. The method of claim 3 in which the three frequency zones are determined using a Taguchi orthogonal array computation that minimizes a radiometric error in the enhanced image.

5. The method of claim 1 in which the image is a Rayleigh sampled image obtained by a Rayleigh sampling system.

6. The method of claim 1 in which step (b) includes
    (i) performing a first number of RL iterations on the image to obtain a first enhanced image including a first frequency zone;
    (ii) performing a second number of RL iterations on the first enhanced image to obtain a second enhanced image including a second frequency zone; and
    (iii) performing a third number of RL iterations on the second image to obtain a third enhanced image including a third frequency zone.

7. The method of claim 6 in which the first, second and third number of RL iterations are determined using a Taguchi orthogonal array computation that minimizes a radiometric error in the image.

8. A method of enhancing an image of a scene comprising the steps of:
    (a) performing a first number of iterations on the image to obtain a first enhanced image;
    (b) transforming the first enhanced image using a Fast Fourier Transform (FFT); and
    (c) selecting a portion of a total energy content of the first enhanced image in the FFT below a first frequency;
    whereby the first frequency and the first number of iterations have values determined by minimizing radiometric errors in the first enhanced image.

9. The method of claim 8 further including the step of:
    determining a value of the first number of iterations by performing the following:
    (i) selecting at least two objects within the image, and
    (ii) minimizing radiometric errors of the selected objects in the first enhanced image.

10. The method of claim 9 in which the radiometric errors of the selected objects are minimized by using a Taguchi orthogonal array.

11. The method of claim 9 in which selecting the objects includes selecting objects of different pixel sizes.

12. The method of claim 8 in which step (a) includes executing a Lucy and Richardson (RL) algorithm to obtain the first enhanced image.

13. The method of claim 8 further including the steps of:
    (d) performing a second number of iterations on the first enhanced image to obtain a second enhanced image;
    (e) transforming the second enhanced image using a Fast Fourier Transform (FFT); and
    (f) selecting a portion of a total energy content of the second enhanced image in the FFT.

14. The method of claim 13 further including the steps of:
    (g) combining the portions of energy content of the first and second enhanced images in the FFT; and
    (h) transforming the combined portions of energy content in the FFT into a final enhanced image of the scene.

15. A machine-readable storage medium containing a set of instructions for causing a computer to perform the following steps:
    (a) executing a Lucy and Richardson (RL) algorithm to enhance an image; and
    (b) iterating the RL algorithm for a number of iterations, in which the number of iterations is determined by a Taguchi orthogonal array process.

16. The storage medium of claim 15 in which the program further includes the steps of:
    (c) transforming the enhanced image using a Fast Fourier Transform(FFT);
    (d) selecting a portion of a total energy content of the enhanced image in the FFT; and
    (e) inverse transforming the selected portion in the FFT into a final enhanced image.

17. The storage medium of claim 15 in which step (b) includes selecting at least two objects in the image, and determining the number of iterations by minimizing radiometric errors of the selected objects.

18. The storage medium of claim 17 in which minimizing the radiometric errors includes controlling parameters in the RL algorithm,
    whereby one of the parameters is the number of iterations.

19. A method of enhancing an image of a scene using Richardson and Lucy (RL) iterations, the method comprising the steps of:
    (a) dividing the image into a plurality of frequency zones, in which the frequency zones are divided by predetermined frequency values; and (b) performing a plurality of RL iterations of each of the frequency zones to obtain an enhanced image of the scene, in which each of the plurality of RL iterations includes a predetermined iteration value;

wherein the predetermined frequency values and each of predetermined iteration values are determined using a Taguchi orthogonal array process and selecting objects within the scene and minimizing radiometric errors of the selected objects.

20. The method of claim 19 wherein each of the selected objects includes a value of R defined as follows:

$$R = |TV - SV|/SV$$

where TV is a true radiometric value of a selected object, and SV is a radiometric value of the selected object after enhancement.

21. The method of claim 20 wherein R of the selected object is approximately 0.60 and the selected object is approximately one pixel in size.

22. The method of claim 20 wherein R of the selected object is approximately 0.10 and the selected object is approximately 5×5 pixels in size.

23. The method of claim 20 wherein R of the selected object is approximately 0.06 and the selected object is approximately 10×10 pixels in size.

* * * * *